May 1, 1962    B. W. WILLIAMS ETAL    3,031,841
ROCKET CHARGE SUSPENSION

Filed Nov. 28, 1955    4 Sheets-Sheet 1

INVENTORS
B. W. WILLIAMS
J. H. MURPHEY, JR
BY
Hudson & Young
ATTORNEYS

May 1, 1962 B. W. WILLIAMS ETAL 3,031,841
ROCKET CHARGE SUSPENSION
Filed Nov. 28, 1955 4 Sheets-Sheet 2

*INVENTORS*
B.W. WILLIAMS
J. H. MURPHEY, JR.

BY Hudson & Young

*ATTORNEYS*

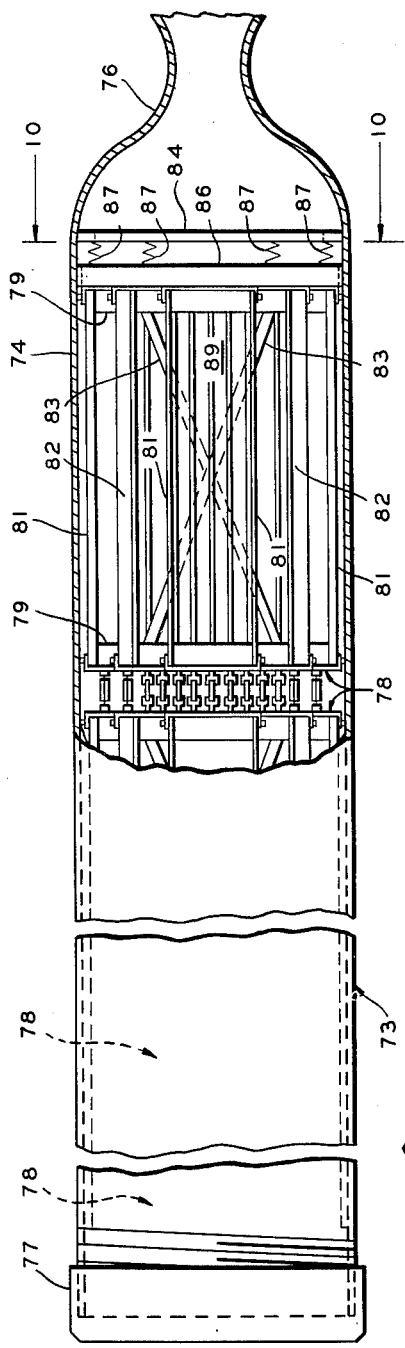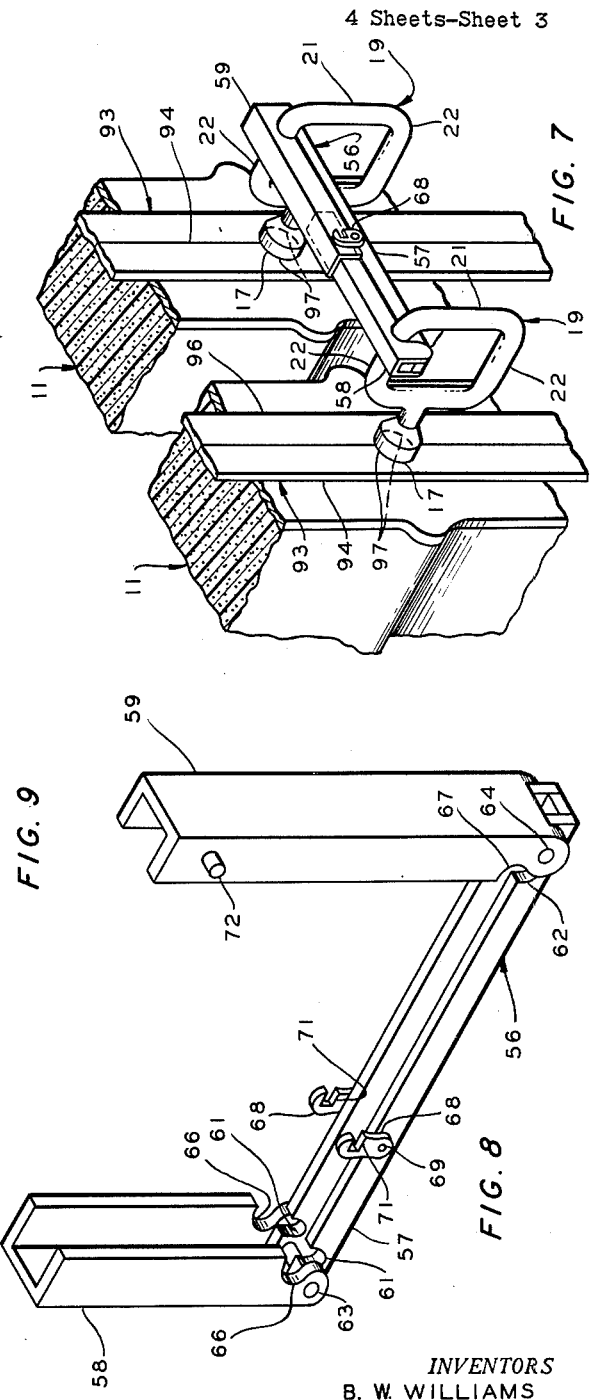
INVENTORS
B. W. WILLIAMS
J. H. MURPHEY, JR.
BY Hudson & Young
ATTORNEYS INVENTORS
B.W. WILLIAMS
J.H MURPHEY, JR.
BY Hudson & Young
ATTORNEYS though the trapping means utilized for supporting and arranging multi-grain propellant charges must be ruggedly constructed, it should not affect the desired uniform density of the propellant mass nor should it obstruct the free and normal flow of combustion gases out through the exhaust nozzle. Furthermore, such trapping means must be capable of supporting the individual propellant grains in a position such that the great inertial forces acting on the grains will be in a direction that will minimize as much as possible the strains on the grains.

3,031,841
ROCKET CHARGE SUSPENSION

Barney W. Williams, Waco, and Joseph H. Murphey, Jr., Lake Jackson, Tex., assignors to Phillips Petroleum Company, a corporation of Delaware
Filed Nov. 28, 1955, Ser. No. 549,274
15 Claims. (Cl. 60—35.6)

This invention relates to rocket charge suspension. In one aspect it relates to rocket projectiles having improved means for suspending rocket grains therein. In another aspect this invention relates to an improved method for supporting and arranging solid, restricted rocket grains, especially the booster-type, for use in large rocket motors.

In the employment of rockets it is important that the means for supporting and arranging the propellant charge in the rocket motor combustion chamber be ruggedly constructed so as to withstand the inertial and vibrational forces encountered during the short duration and rapid acceleration of rockets employing thin-webbed, multi-grain propellant configurations. The trapping means for supporting and spacially arranging the individual rocket grains in a propellant charge unit must preserve the correct axial alignment of the grains throughout the combustion of the same. The trapping means must also be so designed that the severe lateral accelerations often experienced during operation will not hinder the desired trajectory.

In the main, the prior art means for supporting and arranging multi-grain propellant charges are concerned with small, light-weight propellant grains. Double web, booster-type rocket grains such as the propellant grains disclosed and claimed in the U.S. application of B. R. Adelman, Serial No. 453,772, filed September 2, 1954, now Patent No. 2,939,396, have recently been developed for use in multi-grain propellant charges. Large, heavy rocket grains of the booster-type present scale-up problems of assembly not found in the prior art. Support of large, heavy booster-type grains in the canisters, sleeves, and like prior art means would be impractical because sufficient burning surface area would not be available. Self-supporting means proposed in the prior art would likewise be impractical because of the great inertia of the heavy booster-type grains. Because booster-type rocket motors must reach great velocities in extremely short periods, with a consequent sudden increase in inertia load upon the propellant charge, it is essential that the trapping means employed securely retain the propellant grains in fixed position during operation. Since multi-grain propellant charges of the booster-type may weigh as much as 6,000 lbs. or more and comprise a plurality of individual rocket grains weighing 60 lbs., for example, the design criteria for the trapping means becomes very important and it is essential that the multi-grain propellant charge acts for all intents and purposes as a single grain. Moreover, the trapping means must be so designed that the forces tending to pull the propellant material from the trapping members during operation will be of insufficient magnitude to cause a loss of propellant material, a phenomenon which occurs when a portion of unburned propellant material breaks off from the grain proper and escapes through the exhaust nozzle causing a sharp drop in pressure due to the sudden decrease in burning surface area. These unburned fragments of propellant material may even become lodged on the support grid in the rocket motor combustion chamber with a consequent sharp rise in pressure due to the sudden increase in burning surface area. Thus, there has arisen a need for means of positively supportng and arranging the heavy multi-grain propellant charge in the rocket motor. Though the trapping means utilized for supporting and arranging multi-grain propellant charges must Accordingly, we propose by the practice of this invention to provide improved means for suspending multi-grain propellant charges of the booster type. Broadly contemplated, our invention comprises providing the protruding ends of the support rods of an individual rocket grain (such as disclosed in the aforementioned Adelman application) with interlocking means, hereinafter described in detail, in such a manner that a plurality of such individual grains may be positively secured and spacially arranged in a multi-grain propellant charge unit for use in a rocket motor. One of the protruding ends of the support rod terminates in an engaging member, hereinafter referred to as a D-ring, and the other protruding end terminates in a singly hinged first lock member which has complementary grooves. Longitudinal stability of the individual grains is achieved by interlocking a D-ring member of one grain's support rod with the singly hinged member of the support rod of an adjacent longitudinally aligned grain. We also provide means for laterally stabilizing a plurality of individual grains by interlocking said grains in a spaced relationship by providing doubly hinged interlocks or second lock members which are similar to the singly hinged members but which are grooved to interlock and maintain the lateral distance between the D-rings of two grains. By the practice of this invention a plurality of rocket grains may be readily loaded in a multi-grain propellant charge unit and the whole inserted into a rocket motor.

An object of this invention is to provide means to increase the facility with which rocket motors utilizing multi-grain propellant charges may be manufactured and loaded in a rocket motor.

Another object is to provide means for positively supporting large, heavy booster-type rocket grains within a rocket motor combustion chamber, said means characterized by light weight, ease of loading, simplicity, and positive action.

Another object is to provide a ruggedly constructed multi-grain propellant charge unit which may be readily loaded in a rocket motor.

Another object is to provide a ruggedly constructed multi-grain propellant charge unit in which the individual rocket grains are maintained in a fixed position under the severe conditions of acceleration and vibration encountered during the operation of a rocket motor comprising the same.

Another object is to provide a ruggedly constructed multi-grain propellant charge unit in which the individual rocket grains are so arranged that the normal flow of gases to the exhaust nozzle is unimpeded.

Another object is to provide a ruggedly constructed multi-grain propellant charge unit in which the individual rocket grains are so secured that the forces tending to pull the propellant material from the rocket grain supports will be of an insufficient magnitude to cause an appreciable variation in the combustion chamber pressure.

A further object is to provide a solid rocket grain having improved means associated therewith for supporting the same in a multi-grain propellant charge unit.

A still further object is to provide a rocket motor utilizing multi-grain propellant charge units such as the booster-type, for example, and characterized by improved operational performance.

The foregoing and other features of our invention will be better understood from the following detailed description and appended claims taken in conjunction with the accompanying drawings in which:

FIGURE 7 is an isometric view shown in partial cross section of portions of two spaced rocket grains provided with a further embodiment of the interlocking means of our invention.

FIGURE 8 is a detail isometric view of the interlocking means shown in FIGURE 6.

FIGURE 9 is a cutaway view shown in elevation a rocket motor comprising propellant charge units having rocket grains provided with interlocking means of our invention.

Figure 1:
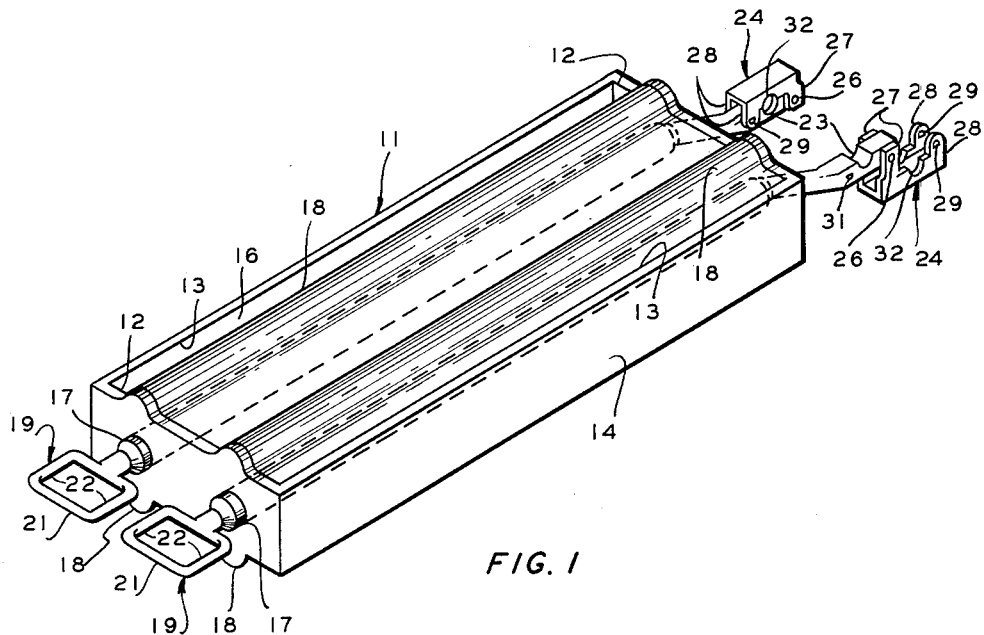
FIGURE 1 is an isometric view of a solid, restricted rocket grain of the double web type illustrating one embodiment of our invention.

Referring to the drawings now in detail, and to FIGURE 1 in particular, there is shown a restricted rocket grain 11 which is similar in some respects to that disclosed and claimed in the aforementioned Adelman application. The rocket grain 11 has a rectangular parallelepiped configuration with its ends 12 and sides 13 covered by burning restricting material 14 while its other oppositely disposed upper surface 16 and lower surface (not shown) are exposed or unrestricted to permit burning of the propellant material. The layer of burning restricting material can be made from any of the slow-burning materials used for this purpose in the rocket art, such as cellulose acetate, ethyl cellulose, butadiene-methylvinylpyridine copolymer, GRS, and the like. The rocket grains which can be utilized in the practice of this invention can be prepared from several known propellant materials. The following is a typical formulation for the preparation of propellant material for booster-type rocket grains and it is to be understood that it is set forth for illustrative purposes only and does not unduly limit the invention.

|  | Parts per 100 parts of rubber | Parts. weight percent |
|---|---|---|
| Binder |  | 17.5 |
| Butadiene/methylvinylpyridine (90/10) | 100 |  |
| Carbon black | 10-30 |  |
| TP-90B [1] | 10-30 |  |
| Flexamine [2] | 0-5 |  |
| Aerosol-OT [3] | 0-2 |  |
| Sulfur | 0-2 |  |
| SA-113 [4] | 0-2 |  |
| Zinc oxide | 0-5 |  |
| Oxidizer |  | 82.5 |
| Ammonium nitrate (70.1-78.4) |  |  |
| Ammonium perchlorate (4.1-12.4) |  |  |
| Catalyst Milori blue [5] |  | 1.0-2.0 |

[1] Dibutyl carbitol formal.
[2] A physical mixture containing 65% of a complex diarylaminekeotne reaction product of 35% of N,N'-diphenyl-p-phenylenediamine.
[3] Dioctyl ester of sodium sulfosuccinic acid.
[4] N,N-dimethyl-S-tertiary butyl sulfenyl dithiocarbamate.
[5] A pigment similar to Prussian blue but a red tint, prepared by the oxidation of a paste of potassium ferrocyanide and ferrous sulfate.

Figure 2:
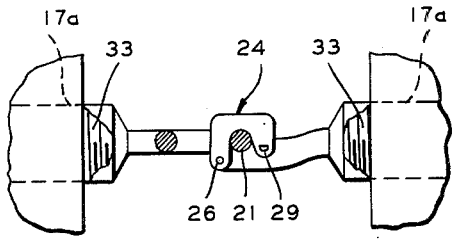

Rocket grain 11 is shown provided with longitudinal internal support members or rods 17 (preferably made of metal) which protrude therefrom. The exposed or unrestricted upper surface 16 and lower surface (not shown) of rocket grain 11 is provided with ribs 18 which are likewise unrestricted and form part of said upper and lower surfaces. The total surface area of ribs 18 is equal to or slightly greater than the surface area of the perforation in the propellant material of rocket grain 11 provided for support member 17. One of the protruding ends of each support member 17 is provided with a D-ring 19 having integral connecting link portions 21 and 22 while the other protruding end is provided with a groove or notch 23 and is connected to a hinge member 24 by pivot pin 26, one of which hinge members 24 is shown in open position. The hinge members 24 have a channel bar configuration in cross section with its side walls partially cut away to form two sets of depending portions 27 and 28. Depending portions 27 are connected to one of the protruding ends of the support member 17, just beyond the groove 23, by a pivot pin 26 and hinge member 24 is pivotable thereabout. Depending portions 28 are provided with small depressions 29 on the inside thereof and these are adapted to receive the small protuberances or nubs 31 on support members 17 when the hinge members 24 are pivoted and snapped thereto. The side walls of the hinge members 24 are cut away to provide each with a groove 32 thereon the radius of which is substantially equal to that of groove 23 of support members 17. When the hinge members 24 are pivoted and snap fitted to support members 17 by means of depressions 29 and nubs 31, the complementary grooves 23 and 32 form passages the cross sectional area of which are substantially equal to that of connecting link portions 21 of D-rings 19. Thus, when the connecting link portions of the D-rings of another rocket grain are fitted in the passages provided by the hinge members and support rods of another rocket grain, as shown in FIGURE 2, a positive interlock of these grains is thereby provided and longitudinal stability of the individual grains achieved. It is to be noted that those protruding ends of the support members 17 which are pivotally connected to hinge members 24 are bent at an angle in order that the passages provided by complementary grooves 23 and 32 are in alignment or in the same plane with the connecting link portions 21 of D-rings 19, for a purpose which will be hereinafter set forth.

While the protruding ends of the support members 17 of the rocket grain 11 are integral therewith, they may be modified as in FIGURE 2 wherein they are threadedly connected to support rods 17a by means of threads 33.

Figure 3:
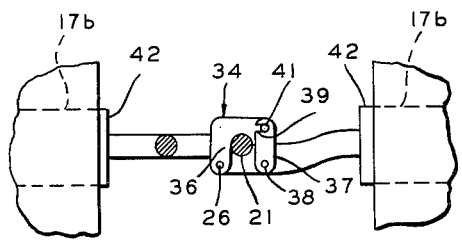
FIGURES 2 to 6 are enlarged, partial cross section views of portions of two spaced rocket grains provided with various embodiments of the interlocking means of our invention.

FIGURE 3 illustrates a further embodiment of my interlocking means wherein the hinge member 34 is provided with only one set of depending portions 36 and the protruding end of that support member 17b having a D-ring integral therewith is provided with a latch member 37 pivotable at 38 and provided wtih a groove 39 adapted to be latch-fitted to a protuberance or nub 41 on hinge member 34. Support members 17b are provided with shoulders 42 immediately outside of the restricting material for a purpose hereinafter set forth.

Figure 4:
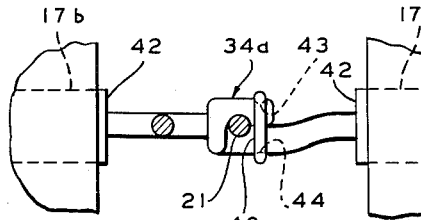

In FIGURE 4, a further modification of hinge member 34a is shown provided with a small groove 43 and the protruding end of the support member 17b having a D-ring integral therewith is also provided with a small groove 44, said grooves 43 and 44 adapted to tightly receive a split ring 46 which slides over hinge member 34a and tightly secures together the connecting link 21 and the hinge member 34a.

Figure 6:
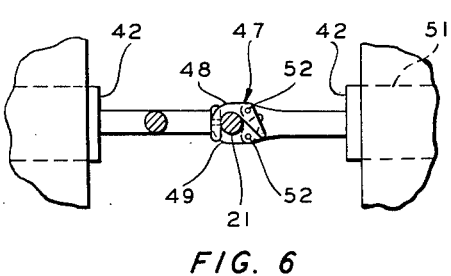
Figure 5:
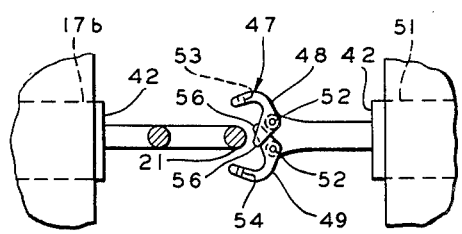
Figure 11:
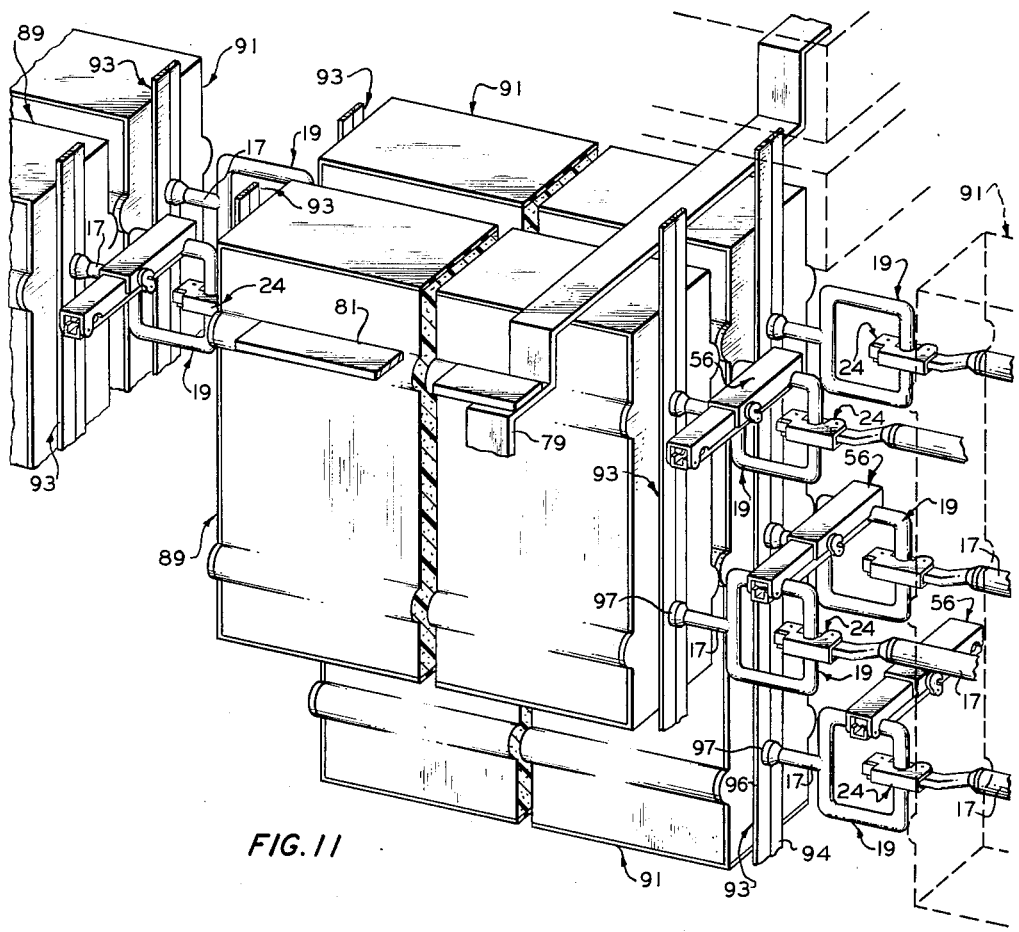
FIGURE 11 is an isometric view of a portion of FIGURE 9 illustrating details thereof.
Figure 12:
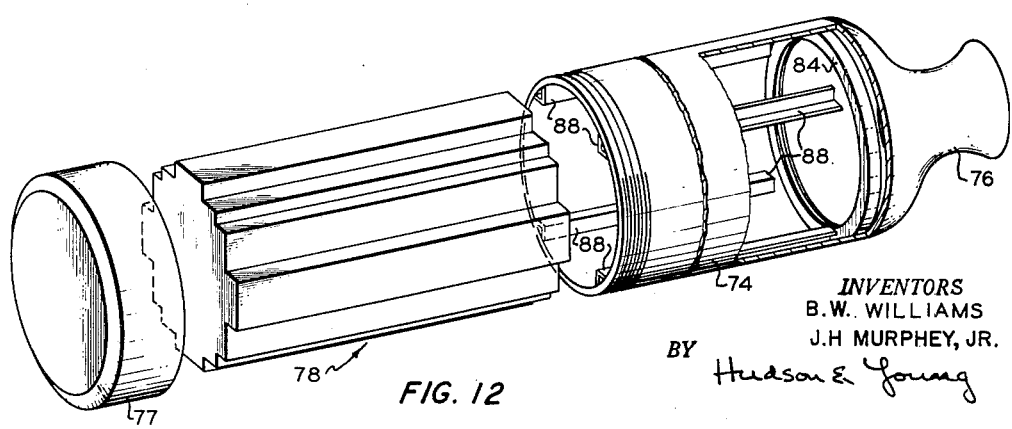
FIGURE 12 is an exploded view of FIGURE 9 schematically illustrating the propellant charge.

FIGURES 5 and 6 illustrate a further embodiment of our interlocking means wherein the D-ring member of one rocket grain is interlocked with a coupling means 47 of another rocket grain. The coupling means 47 is shown in an open position in FIGURE 5 and in a closed or interlocked position in FIGURE 6. Coupling means 47 comprises two prongs 48, 49 pivotally connected to the protruding end of a support rod 51 by pivot pins 52. One extremity of prong 48 is provided with a protuberance or nub 53 on its inner surface and one extremity of prong 49 is provided on its inner surface with a complementary groove 54; thus, when the prongs 48, 49 are pivoted they are snap fitted at these extremities by nub 53 and groove 54, as shown in FIGURE 6. Prongs 48, 49 are caused to be pivoted when the connecting link portion 21 is longitudinally moved toward coupling means 47 (in open position) and moves to the extremities 56 of the prongs 48, 49, causing the latter to lock as shown in FIGURE 6.

In all of the embodiments of the interlocking means described in detail hereinbefore and illustrated in FIGURES 1 to 6, longitudinal stability of each rocket grain is achieved when the same are assembled in a multi-grain propellant charge unit.

The interlocking means we have invented for laterally stabilizing a plurality of individual rocket grains in spaced relation when the same are assembled in a multi-grain propellant charge unit is illustrated in FIGURES 7 and 8. The two rocket grains 11 are provided with support members 17 each of which has a protruding end terminating in a D-ring 19. Since the rocket grains 11 are of the double-web type, burning of the propellant material takes place on two unrestricted surfaces of each rocket grain 11 and thus it is necessary to maintain these rocket grains in spaced relation when the same are assembled in a multi-grain propellant charge unit. We accomplish this by interlocking the D-rings 19 of two parallel spaced rocket grains 11 with a double hinged member 56, which is illustrated in FIGURE 7 in a closed or interlocked position and in an open position in FIGURE 8.

Double hinged member 56 essentially comprises a base member 57, and pivotable members 58 and 59, all of which members are of channel bar configuration in cross section. The side walls of base member 57 are provided with grooves 61 and 62 at either extremities thereof. Pivotable members 58 and 59 are both pivotally connected at one of their extremities to the corresponding extremities of the base member 57 by pivot pins 63 and 64 respectively. The pivotally connected extremities of both pivotable members 58 and 59 are provided with grooves 66 and 67 respectively. When the double hinge member 56 is in its closed or interlocked position, complementary grooves 61 and 66 lock the connecting link portion 22 of one D-ring of one rocket grain and complementary grooves 62 and 67 lock the connecting link portion 22 of another rocket grain, in the manner illustrated in FIGURE 7. As illustrated in FIGURE 7, the shorter pivotable member 58 is overlapped to some extent by the longer pivotable member 59 when the double hinged member 56 is in closed position. Latches 68 are pivotally connected to the side walls of base member 57 by pivot pins 69 and are provided with grooves 71 adapted to receive the nubs 72 on either side wall of pivotable member 59 when the double hinge member 56 is in closed position, thereby positively fastening pivotable members 58 and 59 in closed position.

FIGURE 7 also illustrates how two longitudinally aligned grains of adjacent charge units can be interlocked. The link portion 21 of one D-ring 19 (i.e., that D-ring affixed to the support rod 17 of the grain 11 on the right-hand side of FIGURE 7) is shown in rigid interlocked connection with the hinged lock member 24 of a longitudinally aligned grain (not shown) of an adjacent charge unit (not shown), as described previously in reference to FIGURE 1 and as shown in FIGURE 9.

Referring to FIGURES 9, 10, 11, and 12, a rocket motor 73 comprises a shell or case 74 having attached to its aft end a nozzle 76, which may be adjustable, and to its head end a closure or cover 77. The rocket motor 73 is loaded or charged with a plurality of frame units 78 each comprising a pair of end formers 79 spaced apart in perpendicular planes and rigidly connected by flat stringers 81 and L-irons 82. The end formers 79 are preferably formed of flat metal bands or strips and welded or otherwise secured at their ends to form continuous bands of metal. Stringers 81 and L-irons preferably overlap end formers 79 and are welded to same, although they may be secured thereto by riveting or other means. Cross braces 83 may be utilized to strengthen the frame unit 78 and they may be rigidly secured at their ends to the end formers 79 by any suitable means, such as welding, and are preferably secured to each other at the area of intersection. The inside surface of casing 74 is provided with L-irons 88, suitably secured thereto, for example, by welding (see FIGURE 10), and articulate with the L-irons 82 of frame unit 78. The two pairs of diametrically opposed L-irons 82 and 88 support and prevent substantial rotary or lateral movement of the frame unit 78 after the latter is charged into the rocket motor 73. Lower L-irons 88 serve as a track or a pair of rails on which to load the frame unit into the rocket motor 73. L-irons 88 extend substantially the length of the rocket motor case to permit loading of a plurality of charged frame units.

At the aft of the rocket motor 73 a retaining ring 84 is secured to casing 74 by suitable means, such as welding. A movable flanged retaining ring 86 is adapted to move longitudinally within rocket motor 73 and it is provided with compression springs 87 on the outside surface thereof which are adapted to abut the inside surface of retaining ring 84. Flanged retaining ring 86 is adapted to abut the end formers 79 and when rocket motor 73 is under operational loads such as acceleration, such loads acting upon the frame units 78 will be transmitted directly to the casing 74 by reason of rings 84 and 86 and springs 87.

Figure 10:
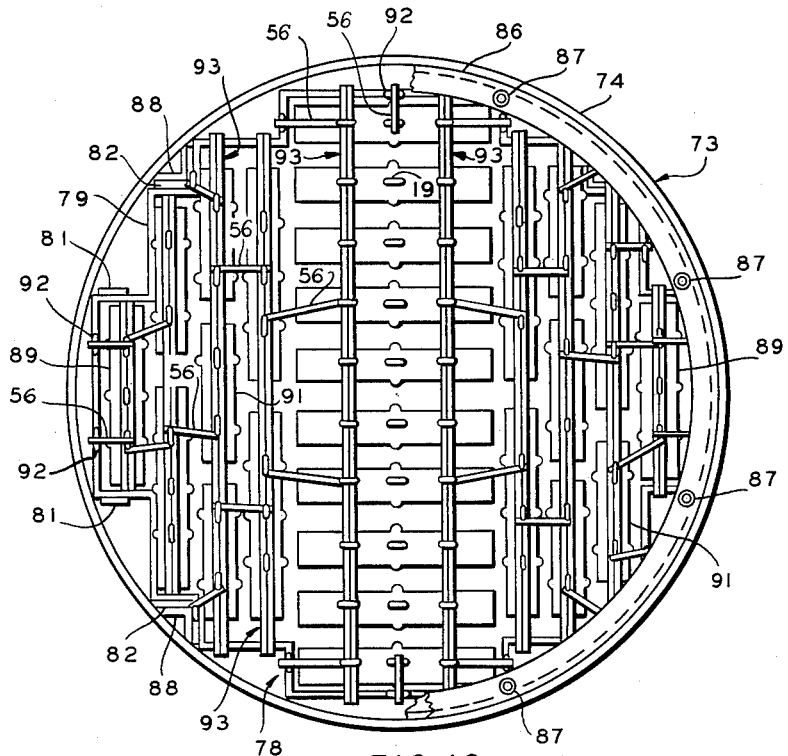
FIGURE 10 is a cross section view of the rocket motor of FIGURE 9 taken along the line indicated.

The rocket grains 11 as illustrated in FIGURE 1 are shown provided with a pair of support members 17; however, as shown in FIGURE 10, they may be provided with a third support member. The frame units 78 are charged with a plurality of rocket grains 89 and 91 in a special arrangement such as shown clearly in FIGURE 10. Rocket grains 89 and 91 are held in spaced relation by means of the double hinge members 56, as illustrated in FIGURE 7. As shown in FIGURE 10, the double hinged members 56 may vary in length and interlock different sized rocket grains 89 and 91 which rocket grains need not be parallel spaced and their support members need not be in the same perpendicular or parallel planes. The end formers 79 are provided with D-ring members 92 welded or suitably secured by other means on their end portions and these D-ring members 92 are interlocked with the D-ring members 19 of various rocket grains in proximity therewith by double hinge members 56. For illustrative purposes, only a limited number of D-rings 19 are interlocked with double hinged members 56 and all, a part, or less than the number of D-rings 19 shown may be interlocked, and, similarly, the number of D-rings 92 on the end portions of the end formers 79 may be varied.

In FIGURES 9 and 10, the spaced arrangement of rocket grains 89 and 91 may be reinforced by stringers 93, shown in detail in FIGURE 7 which prevent the interlocked rocket grains from laterally swaying within the frame unit. The stringers 93 comprise two complementary strips 94 and 96 which abut each other at a common edge which is provided with grooves 97 adapted to provide a perforation, when strips 94 and 96 are in contact, for the passage therethrough of the protruding ends of support members 17. In order to insure that the operational loads encountered during firing of the rocket motor 73 be transmitted directly to the support members 17 rather than the propellant material itself, the protruding ends of the support members 17 are preferentially provided wtih a shoulder 42 as shown in FIGURES 3 to 6. The ends of the strips 94 and 96 may be secured to the end former 79 by bolts or any other suitable means which lend to the easy attachment of the strips 94, 96 upon charging the frame unit 78.

Referring to FIGURE 9, the individual rocket grains of one frame unit 78 can be longitudinally interlocked with the rocket grains of another frame unit 78 in longitudinal alignment therewith by means shown in detail in FIGURES 2 to 6.

There is thus provided a relatively simple arrangement for supporting the propellant charge, the D-ring and hinged member holding the grains against longitudinal displacement or vibration, and the D-rings and double hinged members preserving the grains against lateral displacement or vibration. This construction is particularly advantageous in that there is no likelihood of the rocket grains becoming displaced or shifted to an off-center position during flight of the rocket projectile. As a result, the projectile will conform to its intended trajectory pattern.

In assembling each multi-grain propellant charge unit, the individual rocket grains provided with support members having their protruding ends adapted for interlocking, as hereinbefore described, are loaded in a frame unit and positively supported and arranged therein as illustrated in FIGURES 9 and 10. A first charged frame unit is inserted preferably in the head end of the rocket motor. A second charged frame unit, with individual rocket grains positively supported and arranged in a similar manner, is subsequently inserted in the rocket motor in such a manner that all of the D-ring members of the first charge frame unit are interlocked with the hinged members of the second charge frame unit whose support members are in alignment therewith. When the singly hinged members illustrated in FIGURES 1 to 4 are employed, this may be accomplished by allowing a portion of the first charged frame unit to extend out from the head end of the rocket motor casing to enable the hinged members of the second charged frame unit to be interlocked therewith prior to the insertion of the second charged frame unit in the rocket motor casing. When the two charge frame units are thus interlocked, they may be moved further within the rocket motor casing with a portion of the second charge frame unit extending out from the head end of the rocket motor casing to permit its unlocked D-ring members to be interlocked with a 3rd charged frame unit, and so on.

When the coupling means illustrated in FIGURES 5 and 6 are employed, the first charged frame unit inserted in the rocket motor casing may be immediately moved therein to abut the retaining ring. The second charged frame unit may then be inserted in the rocket motor casing and moved therein until its D-ring members abut the coupling means of the first charged frame unit causing them to pivot and interlock with the D-ring members of the second charge frame unit, as illustrated in FIGURES 5 and 6. Similarly, other charged frame units may be interlocked with the previously inserted charge frame unit, depending upon the length of the rocket motor casing, so as to comprise a rocket motor having a plurality of charged frame units such as illustrated in FIGURE 9.

It will be apparent from the foregoing discussion and drawings that those skilled in the art may employ variations in the procedure for loading a rocket motor illustratively set forth above and our invention is not to be unduly limited thereto. The individual rocket grains may be formed to exact dimensions in automatic machinery and loaded in the frame units by unskilled labor without affecting the uniformity of loading.

Although our invention finds particular utility in the spacial arrangement and interlocking of double-web type, restricted rocket grains, such as disclosed and claimed in the aforementioned Adelman application, it is to be understood that our invention is not necessarily limited thereto. Rather, our interlocking means may be advantageously employed for spacially arranging and positively supporting any large, heavy, booster-type rocket grains in multi-grain propellant charge units. Our novel means for spacially arranging and supporting such grains may be advantageously employed without sacrificing any control over the relationship between the area of the burning propellant material, the volume of combustion space available, and the area of the orifice. The rocket grains thus suspended and supported by the practice of our invention are not easily displaceable and our novel means will preserve their spacial arrangement throughout the combustion of the propellant.

Since many posible variations and modifications may be made of this invention by those skilled in the art without departing from the scope or spirit thereof, it is to be understood that all matter herein set forth in the discussion and shown in the drawings are merely illustrative and do not unduly limit my invention.

We claim:

1. In a rocket motor having a casing defining a charge chamber and provided at one end with a reduced motor nozzle orifice, a plurality of multi-grain propellant charge units loaded in a tandem manner in said chamber and co-axial therewith, each of said charge units comprising a plurality of parallel spaced grains of propellant oriented in the same direction as the longitudinal axis of said chamber, the grains of each charge unit being suspended in longitudinal alignment with the grains in an adjacent charge unit, each of said grains having at least one longitudinally extending support member passing therethrough with said support member having both forward and rearward protruding ends, means to support said support members in said chamber, a plurality of engaging members each of which are connected to one of said forward protruding ends, and a plurality of lock members each of which are connected to one of said rearward protruding ends, the longitudinally aligned grains of adjacent charge units having their adjacent lock members and engaging members in rigid interlocked connection.

2. In a rocket motor having a casing defining a charge chamber and provided at one end with a reduced motor nozzle orifice, a plurality of multi-grain propellant charge units loaded in a tandem manner in said chamber and co-axial therewith, each of said charge units comprising a plurality of parallel spaced grains of propellant oriented in the same direction as the longitudinal axis of said chamber, the grains of each charge unit being suspended in longitudinal alignment with the grains in an adjacent charge unit, each of said grains having at least one longitudinally extending support member passing therethrough with said support member having both forward and rearward protruding ends, means to support said support members in said chamber, a plurality of engaging members each of which are connected to one of said forward protruding ends, a plurality of first lock members each of which are connected to one of said rearward protruding ends, the longitudinally aligned grains of adjacent charge units having their adjacent first lock members and engaging members in rigid interlocked connection, and a plurality of second lock members each of which rigidly connect the engaging members of two adjacent grains in the same charge unit.

3. The rocket motor of claim 2 wherein said second lock member is a double hinged member comprising a base member and first and second pivotable members, said base and pivotable members having complementary grooves thereby providing passages through which said engaging members of said two adjacent grains in the same charge unit extend, and means whereby said pivotable members are positively snap fitted to said base member.

4. In a rocket motor having a casing defining a charge chamber and provided at one end with a reduced motor nozzle orifice, a plurality of multi-grain propellant charge units loaded in a tandem manner in said chamber and coaxial therewith, each of said charge units comprising a plurality of parallel spaced grains of propellant oriented in the same direction as the longitudinal axis of said chamber, the grains of each charge unit being suspended in longitudinal alignment with the grains in an adjacent charge unit, said grains having a parallelepiped configuration and being restricted on ends and sides and unrestricted on their other oppositely disposed surfaces, each of said grains having at least one longitudinally extending support member passing therethrough with said support member having both forward and rearward protruding ends, means to support said support members in said chamber, a plurality of engaging members each of which are connected to one of said forward protruding ends, a plurality of first lock members each of which are connected to one of said rearward protruding ends, the longitudinally aligned grains of adjacent charge units having their adjacent first lock members and engaging members in rigid interlocked connection, and a plurality of second lock members each of which rigidly connect the engaging members of two adjacent grains in the same charge unit.

5. In a rocket motor having a cylindrical casing defining a cylindrical charge chamber and provided at one end with a reduced motor nozzle orifice, a plurality of multi-grain propellant charge units loaded in a tandem manner in said chamber and coaxial therewith, each of said charge units comprising a plurality of parallel spaced grains of propellant oriented in the same direction as the longitudinal axis of said chamber, the grains of each charge unit being suspended in longitudinal alignment with the grains in an adjacent charge unit, said grains having a rectangular parallelepiped configuration and being restricted on their ends and sides and unrestricted on their other oppositely disposed surfaces, frame means adjacent both ends of each of said charge units, rail means secured to the inner wall of said casing and extending the length thereof, said rail means operatively engaging said frame means and adapted to support and suspend the same within said chamber, each of said grains having at least one longitudinally extending support rod passing therethrough with each support rod having forward and rearward protruding ends, said frame means adapted to operatively engage said protruding ends of said support rods and support and suspend said grains in each of said charge units, a first plurality of engaging members each of which are connected to one of said forward protruding ends and the rearward protruding ends of that charge unit which is adjacent said nozzle orifice, a plurality of first lock members each of which are connected to one of said rearward protruding ends except those of said charge unit adjacent said nozzle orifice, the longitudinally aligned grains of adjacent charge units having their adjacent first lock members and engaging members in rigid interlocked connection, a first plurality of second lock members each of which rigidly connects the engaging members of two adjacent grains in the same charge unit, a second plurality of engaging members secured to each of said frame means and extending from the ends of said charge units, and a second plurality of said second lock members each of which positively connects one of those engaging members secured to one of said frame means with one of those engaging members connected to one of said support rods adjacent thereto.

6. The rocket motor of claim 5 wherein said engaging member is in the shape of a ring having first and second integral connecting link portions, said first link portion being adapted to be interlocked with said first lock member in said adjacent charge unit, and said second link portion being adapted to be interlocked with said second lock member.

7. The rocket motor of claim 6 wherein said first lock member is a single hinged member having a cross section in the shape of a U, each side of said hinged member having a groove adapted to register with a complementary groove on said rearward protruding end thereby providing a passage through which said first link portion of said engaging member of said adjacent charge unit extends, the end extremities of each of said sides of said hinged member forming two depending portions one of which is pivotally connected to said rearward protruding end and the other of which is adapted to pivotally snap fit on said rearward protruding end.

8. The rocket motor of claim 6 wherein said first lock member is a single hinged member having a cross section in the shape of a U, each side of said hinged member having a groove adapted to register with a complementary groove on said rearward protruding end thereby providing a passage through which said first link portion of said engaging member of said adjacent charge unit extends, one extremity of each of said sides of said hinged member forming a depending portion which is pivotally connected to said rearward protruding end, and means whereby said hinged member is positively connected to said rearward protruding end.

9. The rocket motor of claim 6 wherein said first lock member is a coupling member comprising two prongs pivotally connected at one extremity to said rearward protruding end, said prongs having means at the other extremity whereby they are positively snap fitted together, thereby providing a passage through which said first link portion of said engaging member of said adjacent charge unit extends.

10. In a rocket grain comprising a parallelepiped of propellant material, said grain being restricted on its ends and sides and being unrestricted on its other oppositely disposed surfaces, said grain having at least one longitudinally-extending perforation, a rod-like supporting member disposed in said perforation with forward and rearward extending ends protruding therefrom, an engaging member connected to one of said extending ends, and a lock member connected to the other of said extending ends.

11. In a rocket grain comprising a rectangular parallelepiped of propellant material, said grain being restricted on its other oppositely disposed surfaces, said grain having at least one centrally-disposed, longitudinally-extending perforation, and a rod-like supporting member disposed in said perforation with forward and rearward ends extending therefrom, said oppositely disposed surfaces of said grain having outwardly-protruding ribs in longitudinal alignment with said supporting member, an engaging member connected to one of said extending ends, and a lock member connected to the other of said extending ends.

12. The rocket grain of claim 10 wherein said engaging member is a ring having first and second integral connecting link portions, and wherein the lock member of a similar grain is adapted to be interlocked with said first link portion.

13. The rocket grain of claim 12 wherein said lock member is a single hinged member having a cross section in the shape of a U, each side of said hinged member having a groove adapted to register with a complementary groove on that extending end of said supporting member to which it is connected thereby providing a passage through which said first link portion of said similar grain is adapted to extend, the end extremities of each of said sides of said hinged member forming two depending portions one of which is pivotally connected to said extending end of said supporting member to which said hinged member is connected and the other being adapted to snap fit on said last-mentioned extending end.

14. The rocket grain of claim 12 wherein said lock member is a single hinged member having a cross section in the shape of a U, each side of said hinged member having a groove adapted to register with a complementary groove on that extending end of said supporting member to which it is connected thereby providing a passage through which said first link portion of said similar grain is adapted to extend, one extremity of each of said sides of said hinged member forming a depending portion which is pivotally connected to said extending end to which said hinged member is connected, and means whereby said hinged member is positively connected to said last-mentioned extending end.

15. The rocket grain of claim 12 wherein said lock member is a coupling member comprising two prongs pivotally connected at one extremity to said extending end of said supporting member to which said hinged member is connected, said prongs having means at the other extremity whereby they are positively snap fitted together, thereby providing a passage through which said first link portion of said similar grain extends.

References Cited in the file of this patent

UNITED STATES PATENTS

| | | |
|---|---|---|
| 2,510,110 | Hickman | June 6, 1950 |
| 2,718,191 | Garrahan | Sept. 20, 1955 |